United States Patent [19]
Futatsugi et al.

[11] Patent Number: 5,436,616
[45] Date of Patent: Jul. 25, 1995

[54] COMPUTER SCREEN CURSOR POINTING DEVICE WITH CLEANING ALARM

[75] Inventors: Shinji Futatsugi, Chigasaki; Yoshimichi Shimo, Machida; Masahiro Uemura, Kawasaki, all of Japan

[73] Assignee: International Business Machines Corp., Armonk, N.Y.

[21] Appl. No.: 46,528

[22] Filed: Apr. 13, 1993

[30] Foreign Application Priority Data

Apr. 13, 1992 [JP] Japan .................. 4-091365

[51] Int. Cl.⁶ .......................................... G08B 21/00
[52] U.S. Cl. ................................. 340/635; 345/164
[58] Field of Search ............... 340/635; 345/163, 164, 345/165, 166, 167, 179, 180; 368/8; 74/471 XY; 324/226

[56] References Cited

U.S. PATENT DOCUMENTS 4,501,005 2/1985 Miller ........................................ 368/8
4,881,065 11/1989 Soma et al. ........................ 74/471 XY Primary Examiner—James J. Groody
Assistant Examiner—John W. Miller
Attorney, Agent, or Firm—Martin J. McKinley

[57] ABSTRACT

A pointing device such as a mouse is provided with cleaning time determination circuitry 46, 48, 50 for determining whether the cleaning of its movable portions becomes necessary and the user is notified of the necessity of cleaning by visual indication at indicator 52 when an alarm signal is outputted from the determination circuitry.

3 Claims, 4 Drawing Sheets

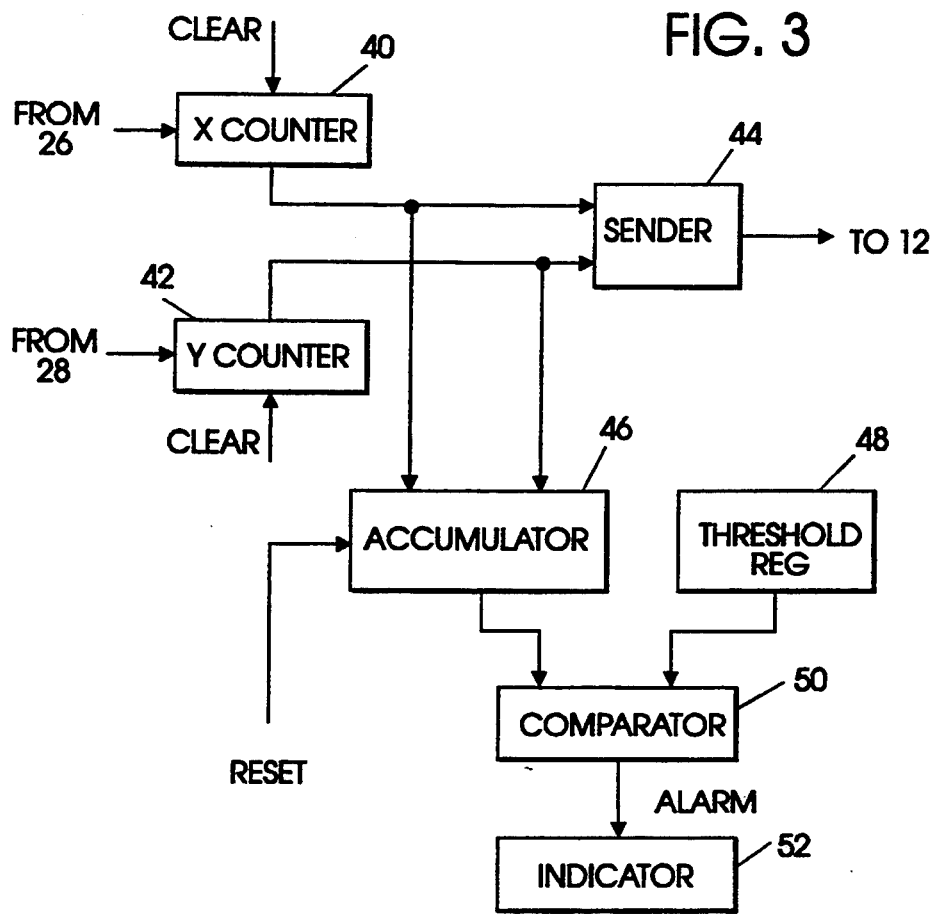
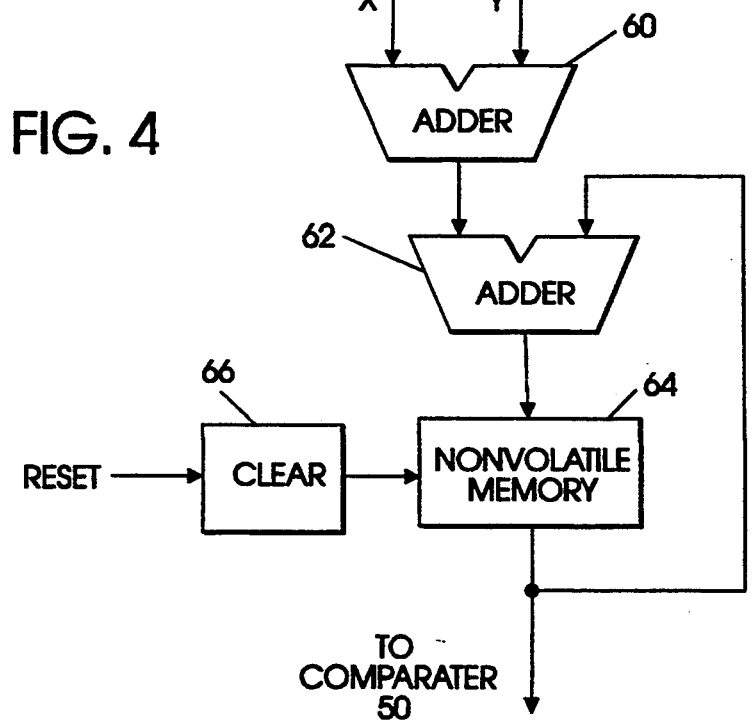

COMPUTER SCREEN CURSOR POINTING DEVICE WITH CLEANING ALARM

BACKGROUND OF THE INVENTION

The present invention relates to a pointing device used on a personal computer, etc., and more particularly to a pointing device with a cleaning alarm, which warns that cleaning becomes necessary due to excessive contamination.

A mouse is a typical pointing device being used on a personal computer or a work station. There are two types of mice, optical mouse and mechanical mouse, the latter being widely used at present. As is well known in the art, a mechanical mouse is slid on a desk surface to rotate a ball at its bottom whose rotation is conveyed to two rollers. Rotation of each roller is detected by an encoder to calculate the amount of movement of the mouse. On a display screen, a pointer moves according to the result of the calculation. The use of such a mechanical mouse over a long period of time causes dust or dirt to be adhered to the surfaces of the ball and rollers, which may prevent the pointer from precisely following and may cause a failure of the mouse. Although such problems could be avoided by disassembling the mouse and cleaning movable portions such as ball and rollers at regular intervals, many users continue to use mice without disassembling and cleaning the mice because such actions are troublesome. To solve this problem, it has been proposed that a mouse is provided with a cleaning mechanism.

For example, Japanese Published Unexamined Patent Application (PUPA) No. 62-135927 discloses a pointing device having cleaning members for removing dust contacted and adhered to a ball and encoder rollers, respectively. Both members are made of materials which do not hinder the smooth rotation of the ball and rollers, and remove dust or dirt adhered to the surfaces of the ball and rollers as they rotate.

Although it is prefer table, in principle, to clean both the ball and rollers, there are so me suggestions to clean either one of them. For example, Japanese PUP A No. 1-94422 discloses a pointing device in which a member for cleaning the surface of a ball is detachably mounted at a ball supporting section, and Japanese Published Examined Utility Model Application No. 2-77741 discloses a mouse provided with a brush which contacts a driver rotating according to the rotation of a ball.

For such integrated c leaning mechanisms, it is necessary to minimize the influence on the rotation of the ball and rollers (especially, the rollers are subject to failure when load increases), which results in limited cleaning capability so that dust or dirt adhered to their surfaces cannot be completely removed. Further, there is a problem how to dispose the removed dust. Therefore, in respect of the complete cleaning of the mouse, disassembling and cleaning by the user are most preferable. The problem is when and how the user is to be prompted to clean.

SUMMARY OF THE INVENTION

The present invention relates to a pointing device including movable portions which need to be cleaned and provides cleaning time determination means for determining when cleaning of the movable portions becomes necessary. The determination means generates an alarm signal when the cleaning is necessary and notifies a user by visual indication. The visual indication can be done by an indicator provided for the pointing device or by a display device of a computer system (for example, personal computer) to which the pointing device is connected.

In the preferred embodiments of the present invention, a cleaning time is determined when the accumulated value of quantities of motion of the pointing device or a pointer reaches a predetermined value, when the analysis of output data from plural encoders shows a tendency of contamination, or when contamination is detected by direct monitoring of the movable portions with a photo sensor or the like. The indicator, which provides visual indication based on the alarm signal from the cleaning time determination means, may be a light-emitting diode (LED) or a liquid crystal display (LCD).

BRIEF DESCRIPTION OF THE DRAWINGS

FIG. 3 is a block diagram showing the configuration of an arithmetic unit in the mouse of FIG. 2.

FIG. 4 is a block diagram showing the configuration of an accumulator for accumulating the running distance of the mouse.

In the following, a mouse is taken as an example, but the present invention is not limited to the mouse and can be applied to any pointing device including rotatable or movable portions that need to be cleaned.

Figure 1:
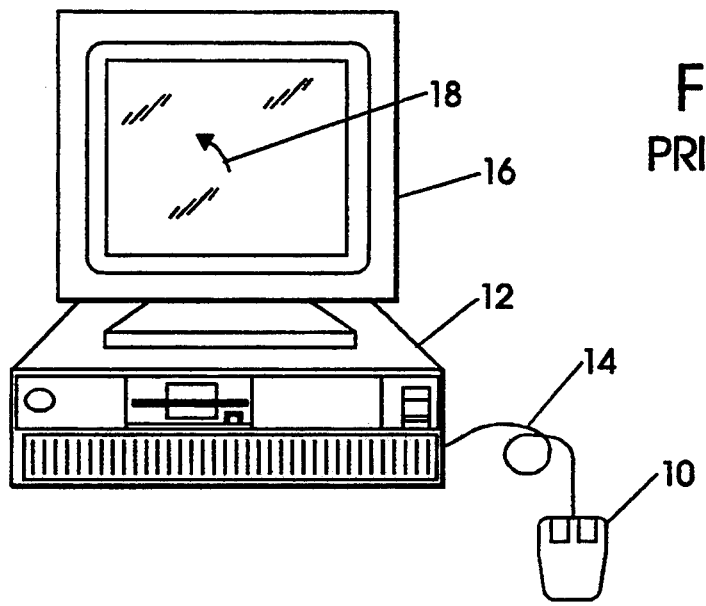
FIG. 1 is a diagram showing the configuration of a computer system (personal computer system) to which a mouse according to the present invention can be attached.

A mouse according to the present invention can be connected to a personal computer system (for example, PS/2 Model 30) as shown in FIG. 1. A mouse 10 is connected to a predetermined port at the rear side of a system unit 12 through a cable 14. When the mouse 10 is glided on a desk, a pointer or cursor 18 moves on the screen of a display device 16 in response thereto. Although not shown in the drawing figure, a keyboard is also connected to the system unit 12. Since the configuration and operations of such a system are well known in the art and are not directly related to the present invention, further details thereof will not be described.

Figure 2:
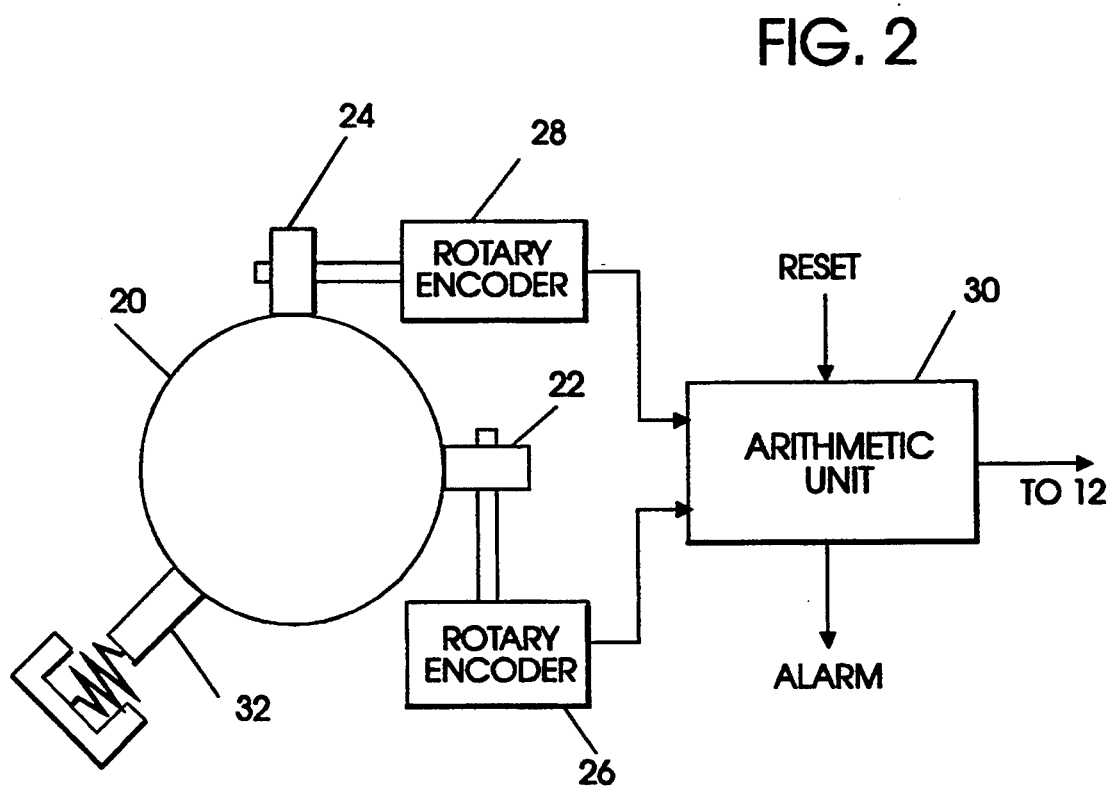
FIG. 2 is a diagram showing the schematic configuration of the mouse according to the present invention.

The overall configuration of the mouse 10 according to the present invention is schematically shown in FIG. 2. The mouse 10 comprises a ball 20 rotated by sliding on a flat surface of a desk or the like, two rollers 22 and 24 for conveying the rotation of the ball 20 in X and Y directions, respectively, two rotary encoders 26 and 28 for detecting the quantities of rotation of the respective rollers, and an arithmetic unit 30 for calculating the quantity of movement of the mouse 10 based on pulse outputs of the encoders. A push wheel 32 presses the ball 20 toward the rollers 22 and 24 by means of a spring force.

The configuration heretofore described is also seen in the conventional mice. As described above, when the mouse is used over a long period of time, dust or dirt adheres to the surface of the ball 20 and moves to the surfaces of the rollers 22 and 24 to thereby reduce friction between the ball and the rollers. As a result, the pointer 18 becomes unable to precisely follow, which influences computer operations by the user. This situation may be recovered by disassembling the mouse and cleaning the ball and rollers but, in many cases, the mouse is continued to be used without cleaning it because such actions are troublesome. Additionally, a beginner is apt to think that the mouse has failed if the pointer 18 moves only a little or does not move on the screen while the mouse 10 is operated.

The present invention solves the above problems by notifying the user that cleaning is necessary through visual indication. To do so, the mouse according to the present invention includes cleaning time determination means for automatically determining a cleaning time and generating an alarm signal. FIG. 2 shows an embodiment wherein the cleaning time determination means is provided in the arithmetic unit 30. However, as described later, the cleaning time determination means can be provided independently of the arithmetic unit 30. A reset signal to the arithmetic unit 30 is generated by depressing a reset switch described later to reset the cleaning time determination means. An example of the configuration of the arithmetic unit 30 including the determination means is shown in FIG. 3.

In FIG. 3, an X counter 40 counts pulses from the encoder 26, while a Y counter 42 counts pulses from the encoder 28. The counters 40 and 42 are to be cleared simultaneously at a constant time interval (for example, every 10 milliseconds) and provide the maximum X and Y count values to a sender 44 before they are cleared out. These count values indicate the quantities of movement or running distances of the mouse 10 in the X and Y directions. The sender 44 creates a send format for the system unit 12 based on the counter values from the counters 40 and 42, and serializes and then sends it to the system unit 12 at the time interval of, for example, 10 milliseconds. The system unit 12 calculates the quantity of movement of the pointer 18, based on the counter values, and accordingly moves the pointer 18 on the screen.

The X and Y count values from the X and Y counters 40 and 42 are provided also to an accumulator 46. This accumulator 46 as well as a threshold register 48, a comparator 50, and an indicator 52 are components provided by the present invention. The accumulator 46 accumulates both count values to calculate an accumulated running distance of the mouse 10 and may be comprised of two adders and a nonvolatile memory such as an EEPROM. FIG. 4 shows an example of the configuration of the accumulator. In FIG. 4, a first adder 60 adds X and Y count values and a second adder 62 adds a sum value from the adder 60 and an accumulated value stored in a nonvolatile memory 64. The output of the adder 62 is written into the nonvolatile memory 64 as a new accumulated value. An accumulated value read from the nonvolatile memory 64 is provided not only to one input of the adder 62, but also to the comparator 50. In the example of FIG. 4, the sum of X and Y count values is accumulated as a value corresponding to the running distance of the mouse 10, but the count values may be accumulated separately. In respect of a running distance of the mouse 10, a square root of a sum of squared count values may be accumulated, but this calculation is troublesome. Also, in some cases, only one of the count values may be accumulated.

In either case, it is necessary to accumulate a value representing the running distance of the mouse 10.

Referring again to FIG. 3, the threshold register 48 is a nonvolatile memory in which a predetermined threshold value is stored. From a hardware point of view, a part of the nonvolatile memory 64 shown in FIG. 4 can be used as a threshold register. Generally, when a total running distance of the mouse 10 exceeds 20 km, problems would occur, e.g. the pointer 18 does not precisely follow. To prevent such problems from occurring, it is necessary to clean the ball 20 and the rollers 22 and 24 until the total reaches 20 km. In the embodiment, a cleaning alarm is issued when a sum of an accumulated running distance in the X direction and an accumulated running distance in the Y direction (greater than the actual running distance) reaches 10 km. To this end, a value (pulse count value) corresponding to it is previously stored in the threshold register. Assuming that a single pulse from each of the encoders 26 and 28 corresponds to a running distance of, for example, 0.1 mm, a value corresponding to $1 \times 10^8$ is stored in the threshold register 48. Needless to say, this value may be varied depending on a mouse to be used and the configuration of the accumulator 46.

The comparator 50 compares the accumulated value from the accumulator 46 with the threshold value from the threshold register 48, and generates an alarm signal if they coincide with each other. The alarm signal is applied to the indicator 52, such as an LED where visual indication is provided by turning it on. Though not shown in the drawing figure, the indicator 52 is provided at a conspicuous portion of the mouse 10. Thus, the present invention issues a cleaning alarm by the visual indication to prompt the user to clean the mouse. Since the accumulated value must be reset to zero after cleaning, a reset switch is provided in the mouse 10. When the user depresses the reset switch after cleaning, the accumulated value stored in the nonvolatile memory 64 of the accumulator 46 is cleared out, that is, zeros are written into the memory 64. A clear circuit 66 shown in FIG. 4, is activated by a reset signal generated by the depression of the reset switch to write zeros into the nonvolatile memory 64. When the accumulated value is reset in this way, two inputs to the comparator 50 no longer coincide with each other so that the alarm signal is turned off and the visual indication by the indicator 52 disappears.

Figure 5:
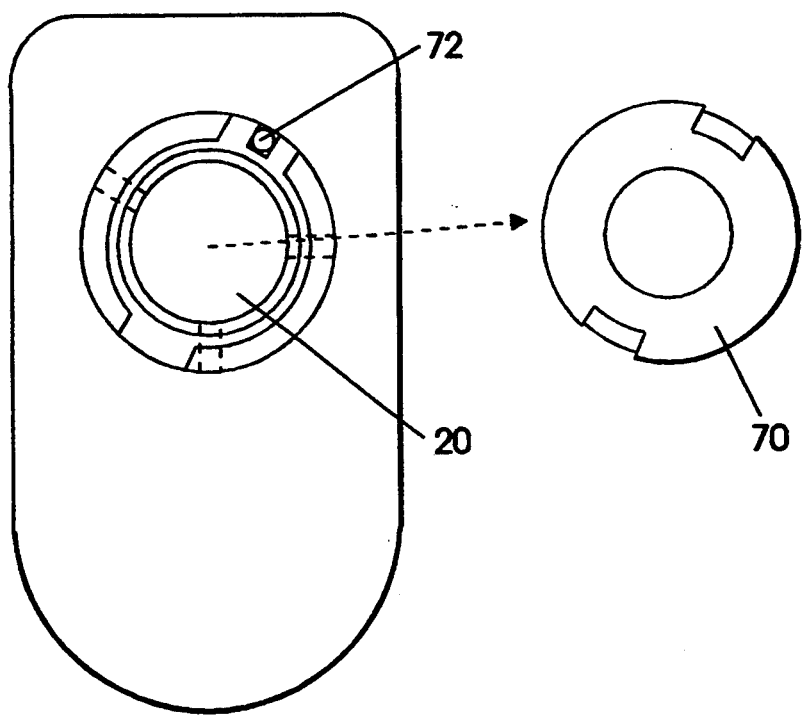
FIG. 5 is a diagram showing an example where a reset switch is provided.

An example of the reset switch is shown in FIG. 5. In the example, if a cap 70 with a circular opening in its center is removed from the ball 20 (as indicated by a dotted line with an arrow) for cleaning, a reset switch 72 will appear. The user cannot touch the reset switch 72 while using the mouse since it is covered with the cap 70. Therefore, in the case where a cleaning alarm is issued by turning the indicator 52 on, it cannot be turned off unless the cap 70 is removed, which enforces cleaning upon the user. It is also possible to implement a mechanism in which the reset switch automatically turns on when the cap 70 is removed. In either case, in respect of the promotion of cleaning, it is preferable to provide the reset switch for clearing the accumulated value within the mouse.

Figure 6:
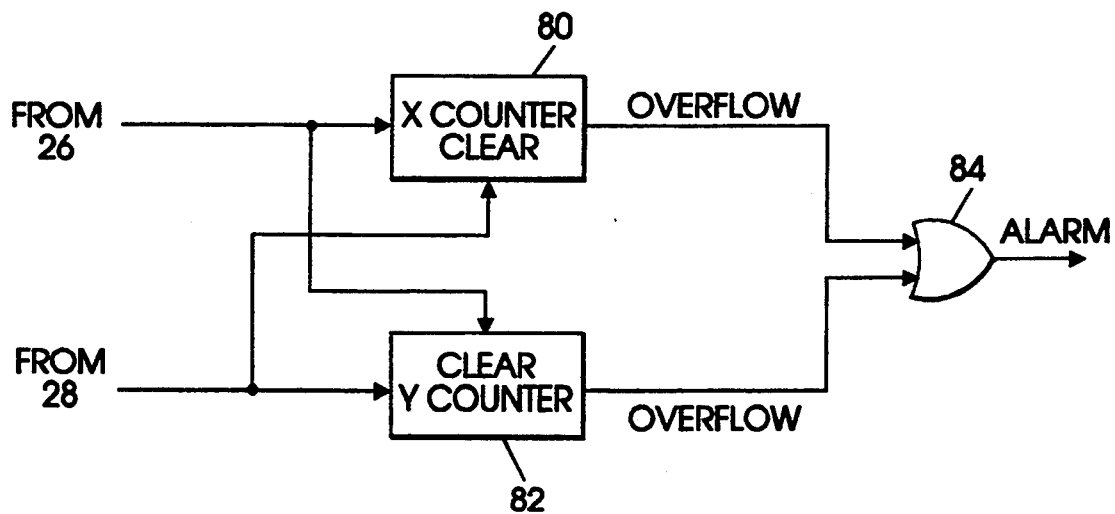
FIG. 6 is a block diagram showing another embodiment of cleaning time determination means.

In the embodiments heretofore described, a cleaning alarm is issued based on a running distance of the mouse, but the alarm may be issued by directly analyzing the outputs of the rotary encoders 26 and 28. Depending on the degree of contamination in the mouse, it is possible that one encoder outputs pulses while the other encoder outputs nothing for a while. Therefore, it may be determined the cleaning becomes necessary when the number of successive output pulses from one encoder reaches, for example 200 while the other encoder outputs noting. An example thereof is shown in FIG. 6. Counters 80 and 82 count pulses from the encoders 26 and 28, respectively, and generate an overflow signal when its count value reaches 200. Each overflow signal is provided to an OR gate 84, the output of which is an alarm signal. Each counter is cleared by a pulse from an encoder associated with the other counter. That is, the X counter 80 is cleared by a pulse from the encoder 28, while the Y counter 82 is cleared by a pulse from the encoder 26. The numerical value 200 in this embodiment is for design purpose and may be changed as required.

Figure 7:
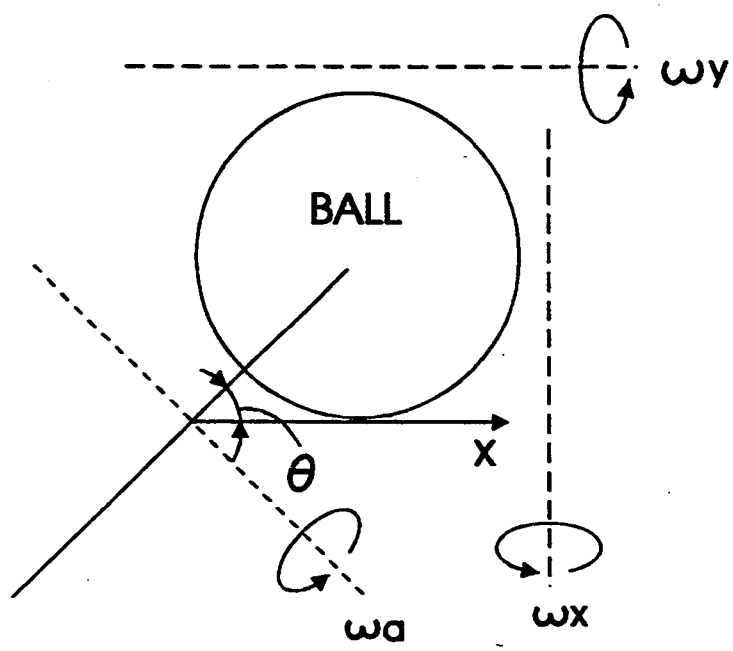
FIG. 7 is a diagram showing a relationship among the angular velocities of rollers in a mouse having three pairs of rollers/encoders.

For a mouse including three pairs of rollers and encoders, a cleaning alarm may be issued based on a slip between the ball and the rollers. As shown in FIG. 7, representing three angular velocities of three rollers obtained from three encoders by $\omega x$, $\omega y$, and $\omega a$, respectively, a $\omega a$'s theoretical value $\omega a$—th in case of no slip between the ball and the rollers is as follows:

$$\omega a—th = \omega x \cos \theta + \omega y \sin \theta$$

where $\theta$ is an angle with which the third roller for detecting the angular velocity $\omega a$ is arranged with respect to the x-axis. A difference between the theoretical value and an actually measured value $\omega a$ is calculated as a slip $\Delta \omega a$ and a cleaning alarm is issued when it reaches a predetermined value.

Contamination can be directly detected by applying light onto the surface of the ball or the rollers and sensing reflected light by a photosensor.

Since the amount of reflected light would decrease if the surface becomes darkish due to dust or dirt adhered thereto, a cleaning alarm may be issued when it reaches a predetermined value.

If cost of and space in the mouse permit, the various cleaning time determination means heretofore described and other possible cleaning time determination means may be combined to notify a cleaning time by ORing their outputs.

With respect to the indicator 52 shown in FIG. 3, the display device 16 of the computer system may be used instead of providing an LED or the like to the mouse. In this case, an alarm signal from the comparator 50 shown in FIG. 3 or the OR gate 84 shown in FIG. 6 is sent, through the cable 14, to the system unit 12. There are two methods for displaying a cleaning message (for example, "Mouse should be cleaned.") on the screen of the display device 16. The first method displays the message when an alarm signal is detected at the time of diagnostic test after power on. This can be done without the intervention of an operating system (OS). The second method displays the message in real time when an alarm signal is detected during normal operations. In this method, it is necessary to add a cleaning message display function to a mouse driver of the OS. In either case, a diagnostic program or a mouse driver can be easily modified.

We claim:

1. A computer system having a pointing device including movable portions requiring cleaning, and generating move signals for a pointer based on the quantity of motion of said movable portions, a system unit to which said pointing device is connected, and a display device for displaying said pointer on a screen, said computer system being characterized in that:

said pointing device is provided with cleaning time determination means for determining whether cleaning of said movable portions becomes necessary, and visual indication is provided on the screen of said display device to prompt cleaning when said determination means has determined that the cleaning is necessary.

2. The computer system according to claim 1, wherein said cleaning time determination means includes detection means for detecting said quantity of motion and alarm means for generating an alarm signal when the quantities of motion detected by said detection means are accumulated and a result of accumulation reaches a predetermined threshold, and said display device provides visual indication in response to said alarm signal.

3. The computer system according to claim 2, further including means for resetting said alarm means.

* * * * *